_United States Patent Office_  3,098,094
Patented July 16, 1963

3,098,094
PRODUCTION OF CARBOXYLIC ACIDS AND SALTS THEREOF FROM ASPHALTENES
Armin C. Pitchford, Bartlesville, Okla., assignor to Phillips Petroleum Company, a corporation of Delaware
No Drawing. Filed May 9, 1960, Ser. No. 27,526
3 Claims. (Cl. 260—524)

This invention relates to the production of carboxylic acids and salts thereof from asphaltenes. In another aspect it relates to the resulting asphaltene carboxylic acids and salts thereof as new compositions of matter.

Over the course of years increasing attention has been given to the utilization of naturally occurring asphalts and petroleum residua. Many procedures for upgrading asphaltic materials have been proposed, patented or used. However, due to the lack of knowledge of the composition of these complex materials and the structure of their major constituents, such as asphaltenes, their field of utility has been limited.

Accordingly an object of this invention is to upgrade asphaltic materials to form useful products, thereby increasing the field of utility of naturally occurring asphalts and petroleum residua. Another object is to provide an improved method of separating a major constituent of asphalt, namely asphaltenes, and treat the same by a novel oxidative procedure to produce acidic asphaltene products having desirable chemical and physical properties which make them especially useful as fluid loss control agents in drilling fluids and fracturing fluids, as anti-stripping agents for asphalt paving compositions, etc. Another object is to provide a novel method for producing carboxylic acids and salts thereof from asphaltenes. Another object is to provide as new compositions of matter asphaltene carboxylic acids and salts thereof. Further objects and advantages of this invention will become apparent to those skilled in the art from the following discussion and appended claims.

Briefly stated, in one of its broader aspects, the subject invention resides in treating asphaltenes with nitric acid to produce asphaltene carboxylic acids, and salts thereof.

The terms "asphalt" or "asphaltic material" as used in this specification and in the appended claims are meant to cover dark brown to black liquid, semi-solid or solid cementitious mixtures of hydrocarbons of natural or pyrogenous origin, or a combination of both, which are completely or substantially soluble in carbon disulfide, and wherein bitumens are the sole or predominate constituent. Naturally occurring or native asphalts useful in the practice of this invention include materials such as albertite, elaterite, gilsonite, grahamite, wurtzilite, Trinidad or Bermudez Lake asphalts, and the like. Pyrogenous asphalts useful in the practice of this invention include those obtained by refining petroleum by distillation, precipitation, cracking, solvent extraction, or similar operations, for example, distillation residues, still bottoms, cracked residues, straight-run residues, asphaltic bitumens, blown asphalt, and the like.

The term "asphaltenes" as used in this specification and in the appended claims is meant to cover those constituents of asphalt which are soluble in carbon disulfide but insoluble in paraffin naphthas, n-pentane, n-hexane, n-heptane, petroleum ether, cyclopentane, and like light hydrocarbons, this asphaltic constituent having relatively high molecular weights (e.g., $10^3$–$10^5$) and a predominantly aromatic character.

The term "asphaltene carboxylic acids" as used in this specification and in the appended claims is meant to cover the acidic products produced by oxidation of the corresponding asphaltene precursor, such as by treating asphaltenes with nitric acid according to this invention, these acidic products being water insoluble and capable of being converted upon neutralization, for example with caustic, to the corresponding water dispersible or soluble salts.

Asphalts having ring and ball softening points in the range of 60 to 350° F. are generally applicable in preparing the asphaltene carboxylic acids, those having softening points in the range of 100 to 250° F. being even more preferred.

Especially useful asphaltic materials are those obtained from asphaltic crude oils, the residua products thereof having from 3 to 60 weight percent, preferably 15 to 25 weight percent, asphaltenes. Petroleum residuum which I have found to be particularly useful as starting material is that obtained by desalting, topping, and vacuum reducing Wafra crude oil, which residuum can be characterized as a 1025° F.+ residuum. Typical asphaltic starting materials will generally comprise 10 to 40 weight percent asphaltenes, 15 to 75 weight percent asphaltic resins, and 20 to 70 weight percent oily constituents.

The asphaltene constituent can be obtained from the asphalt by treating the latter so as to precipitate the asphaltene constituents, using for this purpose a paraffin liquid hydrocarbon such as n-pentane, n-hexane, n-heptane, octane, petroleum ether, petroleum naphthas, cyclopentane and the like, preferably a normal paraffin hydrocarbon having a total of 5 to 8 carbon atoms per molecule. This separation of the asphaltene constituent is essentially a solvent extraction step, resulting in the precipitation or flocculation of the insoluble, solid asphaltenes, the asphaltic resins and oily constituents being soluble in the paraffinic solvent. The ratio of solvent/asphalt can vary over a wide range, generally 5/1 to 100/1 and preferably about 10/1, the particular ratio used depending upon the nature of the asphalt, the particular solvent, and conditions of treatment. Temperatures during extraction will also vary and ambient temperatures as well as elevated temperatures can be used, e.g., up to 415° F. and preferably up to 350° F. The resulting insoluble asphaltenes can be separated from the solvent and other soluble asphaltic material by decantation, filtration, and the like, the insoluble asphaltenes settling in one or two hours or after a number of days. The settling rate can be accelerated by applying a pressure, e.g., 375 p.s.i. at 350° F.

The insoluble asphaltenes can be dried and comminuted, or dispersed or slurried in a suitable, non-oxidizable diluent such as water, paraffins such as pentane, hexane, heptane, octanes, etc., and commercially available highly branched paraffins, such as Soltrols. Generally, the asphaltenes will have specific gravities (60/60° F.) in the range of 1.1 to 1.3, preferably 1.15 to 1.2, and melting points in the range of 350 to 450° F., usually about 400° F.

In the oxidative process of this invention, the asphaltene starting material can be passed in comminuted form or as a dispersion in a suitable inert diluent to a suitable oxidation zone, such as a stirred reactor, where the asphaltenes are oxidized with nitric acid. The reactor can be externally heated or cooled by means of a suitable heat exchange medium, the reaction temperature depending among other things on the concentration of the nitric acid used. The conditions used are favorable to the production of asphaltene carboxylic acids, and a minimum, if any, of nitrated products are produced.

The nitric acid used in this oxidative process will generally have a concentration of from 10 to 70 weight percent, preferably 50 to 60 weight percent. The nitric acid/asphaltenes ratio can vary over a wide range, but generally will be in the range of from 1/2 to 10/1, on an anhydrous basis. Temperatures during treatment will also vary over a wide range, the particular temperature depending on the concentration and amount of nitric acid, the pressure employed (which can be atmospheric or super-atmospheric), the nature of the asphaltenes, and other factors. Generally elevated temperatures will be used in the range of 150° to 350° F., preferably 200° to 250° F. The oxidation reaction period will also vary, and generally will be in the range of from 3 to 30 hours, preferably 5 to 10 hours. The temperature of the oxidation reaction can be controlled by the serial addition of the nitric acid and also by circulating a cooling or heating medium in the external jacket surrounding the oxidation reactor. The reaction mass is continuously agitated by means of a paddle or the like, and the bottoms of the reactor preferably are continuously withdrawn and recycled to the top of the reaction zone to insure complete and quick oxidation. During the reaction, volatile gases, such as nitrogen oxide, and by-products such as low molecular weight aliphatic monocarboxylic acids, e.g., those having 1–5 carbon atoms per molecule such as formic, acetic, butyric, propionic, valeric, etc., are produced and they can be vented from the reactor. If desired the reaction can be stopped by the addition of water. The oxides of nitrogen which are produced can be collected and introduced again into the reactor to obtain full use of their oxidative properties.

The resulting effluent of insoluble asphaltene carboxylic acids and soluble, low molecular weight acids will generally have the nature of a slurry, depending on the nature of the asphaltenes, the degree of oxidation, etc. The oxidation effluent can be subjected to suitable separation procedures to recover the insoluble asphaltene carboxylic acids for use as such, or the oxidation effluent can be directly neutralized with a basic neutralizing agent. Alternatively, the oxidation reaction mixture can be first preliminarily filtered by means of filtration or the like and the filtered solid, water insoluble asphaltene carboxylic acids washed and neutralized, and the resulting neutralized mixture subjected to further filtration to separate the resulting water soluble asphaltene carboxylic acid salts from the insoluble material which can comprise unreacted asphaltenes, coke and other insolubles.

The carboxylic acids produced by the oxidation treatment of asphaltenes according to this invention can be neutralized with any basic neutralizing agent such as anhydrous or aqueous ammonia, or an aqueous slurry or solution of a metal salt, oxide, or hydroxide, or amines. Amines which can be used for neutralizing include primary mono amines having 1–20 carbon atoms such as methylamine through heptadecylamine, di- amines having 3–30 carbon atoms such as trimethylenediamine, hexamethylenediamine, etc. Particularly useful commercially available diamines which can be used include those having the formula $RCH_2NH(CH_2)_3NH_2$, such as Diam 21D (distilled N-coco 1,3-propylene diamine). I prefer to use as the basic neutralizing agent an alkali metal or alkaline earth metal salt, oxide, or hydroxide, thereby converting the resulting asphaltene carboxylic acids to the corresponding alkali metal or alkaline earth metal salts. Metals which are particularly suitable include the alkali metals such as sodium and potassium and the alkaline earth metals such as magnesium, calcium, barium, and the like. The preferred neutralizing agent is an aqueous caustic solution, for example aqueous sodium hydroxide having a concentration of from 10 to 50 weight percent, preferably about 33 weight percent. The neutralizing agent can be added to the oxidation reactor when the oxidation is completed, or the oxidation reaction mixture can be passed to a suitable holding vessel and neutralized there with the neutralizing agent. The oxidation reaction mixture is preferably neutralized to a pH of about 7 to 10, a slight excess of the neutralizing agent being preferred for this purpose. The neutralizing step can be carried out over a wide temperature range, and generally will be in the range of 200 to 240° F. Repeated amounts of the neutralizing agent can be added so as to insure complete neutralization. It is also within the scope of this invention to use a combination of neutralizing agents, for example, the asphaltene carboxylic acids can be first neutralized with anhydrous ammonia and then with sodium hydroxide, or first sodium hydroxide and then anhydrous ammonia. After neutralization, the pH of the neutralized mixture can be adjusted. The neutralized mixture can be allowed to settle and then separated, for example by decantation, centrifugation, filtration, or the like, to separate the carboxylic acid salts from any sludge or other unreacted material that may be present.

Following neutralization, the recovered water soluble asphaltene carboxylic acid salts can be dried, for example by flashing or by use of a suitable drum drier, and the dry product crushed or otherwise comminuted. The neutralized product will generally have a brown to dark black color and will have a friable consistency, and it will also be relatively neutral.

As mentioned hereinbefore, the neutralized product can be used as a fluid loss control agent in drilling fluids or fracturing fluids, or as an anti-stripping agent in asphalt paving compositions. The particular use of the product will dictate the method of recovery and product specification.

The following examples will further illustrate the objects and advantages of this invention, but it is to be understood that the various amounts, ingredients, treating conditions, etc., recited in these examples are merely illustrative and should not be construed so as to unduly limit this invention.

EXAMPLE I

In this example there is described the preparation of suitable asphaltene starting material which can be used to prepare the novel compositions of matter of this invention.

A Wafra crude oil was desalted, topped, and vacuum reduced to yield a 1025° F+ residuum having the properties set forth in Table I.

Asphaltenes were separated from the above-described Wafra 1025° F.+ in a series of batch precipitations wherein a plurality of 4-gallon charges of the residuum were solubilized by adding about an equivalent volume of commercial grade n-pentane. After mixing asphaltic residuum with the solvent, and allowing the mixture to settle, the n-pentane solubles were decanted and filtered without disturbing the settled asphaltenes. The asphaltenes were then slurried with more pentane, filtered, reslurried, and washed with additional portions of solvent, the first washings being added to the original filtrate of pentane solubles. The filtered asphaltenes from each of the batch separations were combined and dried in an oven at 180° F. to yield a dry asphaltene product. Conditions and results of extraction are summarized in Table II. This asphaltene product was used in Example II.

EXAMPLE II

In this example, a number of runs were made according to this invention by oxidizing asphaltenes with 15 percent nitric acid in a stirred reactor. Following the oxidative treatment of the asphaltenes, the reaction mass in each run was filtered to obtain a solid acid residue comprising water insoluble asphaltene carboxylic acids (plus unreacted material and same coke) and a filtrate comprising water soluble volatile acids comprising low molecular weight monocarboxylic acids, e.g., 1 to 5 carbon atoms (formic acid through valeric acid). Portions of the solid acid residues from each run were titrated with a standard base (aqueous sodium hydroxide), the neutralized mixtures filtered to obtain the corresponding water soluble sodium salt of the asphaltene carboxylic acid, and an insoluble residue comprising water insoluble unreacted material and coke. Conditions of oxidation and results of these runs are summarized in Table III.

Table I

| | |
|---|---|
| Volume percent of crude | 33.0 |
| Weight percent of crude | 37.0 |
| Specific gravity, 60/60° F | 1.0158 |
| API gravity, 60/60° F | 7.8 |
| Viscosity, SFS, 210° F | 433 |
| Penetration, 100/5/77° F., mm./10 | 430 |
| Softening point, R. and B., ° F | 93 |
| Asphaltenes (pentane insolubles), wt. percent | 14.46 |

Table II

| | |
|---|---|
| Weight of asphalt, lbs | 375.39 |
| Volume of asphalt, gals | 44.43 |
| Volume of n-pentane, gals | 444.2 |
| Solvent/asphalt ratio | 10/1 |
| Temperature of extraction, ° F | 78–93 |
| Settling time, hrs | 16–72 |
| Asphaltenes yield, lbs | 54.69 |
| Asphaltenes yield, wt. percent | 14.5 |

Table IV

| | Wt. percent |
|---|---|
| Carbon | 57.0 |
| Hydrogen | 4.2 |
| Oxygen (by difference) | 30.0 |
| Nitrogen | 3.1 |
| Sulfur | 5.7 |

Titration of the above-mentioned asphaltene carboxylic acid product according to ASTM procedure D 664–49 resulted in a total acid number of 202 mg. KOH per gram, this value as well as the titration curve indicating that the product comprises predominantly carboxylic acid.

Characterization of the above-mentioned asphaltene carboxylic acid product according to "The Systematic Identification of Organic Compounds," by R. L. Shriner and R. C. Fuson, third edition, Wiley and Sons, Inc., New York, 1948, showed that the product belongs in class $A_1$, this class comprising acids and negatively substituted phenols.

Table III

| | Runs | | | | | | | | | |
|---|---|---|---|---|---|---|---|---|---|---|
| | 1 | 2 | 3 | 4 | 5 | 6 | 7 | 8 | 9 | 10 |
| Asphaltenes, gms | 25 | 25 | 25 | 25 | 25 | 25 | 25 | 25 | 25 | 25 |
| Nitric acid saphaltenes ratio | 7.5 | 3.1 | 1.5 | 1.7 | 1.7 | 1.7 | 1.6 | 1.8 | 1.8 | 0.94 |
| Nickel naphthenate,[a] wt. percent | 0 | 0 | 0 | 1.0 | 5.0 | 10.0 | 5 | 5 | 5 | 0 |
| Oxidation time, hrs | 5 | 5 | 5 | 5 | 5 | 5 | 10 | 15 | 20 | 6.5 |
| Temperature, ° F | 230 | 220 | 214 | 214 | 214 | 214 | 214 | 213 | 213 | 210 |
| Nitric acid consumed, gms | 93.5 | 20.4 | 14.2 | 10.0 | | 30.9 | 14.5 | 18.7 | 21.3 | 8 |
| Yields, wt. percent: | | | | | | | | | | |
|   Solid acids [b] | 108.8 | 116.8 | 106.8 | 108.0 | 104.4 | 116.8 | 87.5 | 110.8 | 112.4 | |
|   Volatile acids [c] | 32.0 | 28.0 | 36.0 | 12 | 32 | 40 | 35 | 24 | 28 | 20 |
| Conversion, wt. percent: | | | | | | | | | | |
|   (1) based on solubility of solid acid in methyl ethyl ketone | 99.7 | 45.5 | 15.5 | 21.2 | 25.5 | 28.4 | 25.1 | 35.0 | 30.7 | |
|   (2) based on solubility of water insoluble unreacted material and coke in benzene | 84.7 | 76.0 | 38.9 | 48.5 | 47.8 | 48.8 | 65.4 | 71.1 | 75.4 | |

[a] Used as oxidation catalyst, wt. percent based on asphaltenes.
[b] Comprises water insoluble material obtained on filtering reaction mass.
[c] Comprises water soluble material obtained on filtering reaction mass.

The data of Table III show that best yields and conversions are obtained with higher nitric acid/asphaltenes ratios, e.g. 7.5, and that such results can be obtained without an oxidation catalyst.

EXAMPLE III

In this example, 300 grams of the asphaltenes prepared according to Example I were reacted with 1050 ml. of 50 percent nitric acid, the nitric acid/asphaltenes ratio being 3/1. The mixture was refluxed for 6.5 hours at 220° to 240° F., heated for one hour at 225° F., filtered hot and washed with water. The residue was then reacted with an additional 1400 ml. of 50 percent nitric acid, refluxed for one hour, heated for two hours at 150° to 175° F., refluxed for four hours, cooled to 150° F. and filtered. Filtration yielded a solid reaction product and a filtrate. The latter was made alkaline with sodium hydroxide to prevent volatization of low molecular weight acids; the odor of butyric acid was very predominant. The filtered insoluble residue was washed with about 3 liters of water until the washings were essentially clear, though still acid to pH paper. The residue was dried in an oven and amounted to about 331 grams.

The resulting asphaltene carboxylic acid product was then subjected to various analytical procedures to determine the nature and composition of the same. Elemental analysis of this product is summarized in Table IV.

Analysis of the above-mentioned asphaltene carboxylic acid product by means of infra-red spectra qualitatively indicated the presence of both —COOH and —$NO_2$.

The above analytical results show conclusively that the products produced by the oxidative treatment of asphaltenes according to this invention are carboxylic acids, with a minimum, if any, of nitration products.

Various modifications and alterations of this invention will become apparent to those skilled in the art from the foregoing discussions, and it should be apparent that the subject invention is not to be unduly limited to that set forth hereinbefore for illustrative purposes.

I claim:

1. A method comprising separating asphaltenes from asphalt by solvent extraction, treating said separated asphaltenes with an oxidizing agent consisting essentially of nitric acid having a concentration in the range between 10 to 70 weight percent at an acid/asphaltene weight ratio in the range between 1/2 to 10/1 and at a temperature in the range between 150 to 350° F., separating the resulting water insoluble residue comprising asphaltene carboxylic acids from the resulting reaction mixture, neutralizing the latter with a basic neutralizing agent selected from the group consisting of ammonia, primary monoamines having 1 to 20 carbon atoms per molecule, diamines having 3 to 30 carbon atoms per molecule, alkali metal salts, alkali metal oxides, alkali metal hydroxides, alkaline earth metal salts, alkaline earth metal oxides, and alkaline earth metal hydroxides, and separating from the resulting neutralized mixture the resulting water soluble asphaltene carboxylic acid salts.

2. The method according to claim 1 wherein said neutralizing agent is an alkali metal hydroxide.

3. The method according to claim 1 wherein said neutralizing agent is sodium hydroxide.

References Cited in the file of this patent
UNITED STATES PATENTS

| 2,461,740 | Kiebler | Feb. 15, 1949 |
| 2,786,074 | Goren | Mar. 19, 1957 |
| 2,851,488 | Elkins | Sept. 9, 1958 |
| 2,930,813 | Schenk | Mar. 29, 1960 |

OTHER REFERENCES

Murphy, "Chem. Abstracts," vol. 40, p. 3593[4], 1946. (Available in Sci. Library.)

UNITED STATES PATENT OFFICE
CERTIFICATE OF CORRECTION

Patent No. 3,098,094                                July 16, 1963

Armin C. Pitchford

It is hereby certified that error appears in the above numbered patent requiring correction and that the said Letters Patent should read as corrected below.

Column 6, line 73, for "latter" read -- separated asphaltene carboxylic acids --.

Signed and sealed 3rd day of March 1964.

(SEAL)
Attest:

ERNEST W. SWIDER

Attesting Officer

EDWIN L. REYNOLDS

Acting Commissioner of Patents